(12) United States Patent
Marshall et al.

(10) Patent No.: US 7,069,457 B2
(45) Date of Patent: Jun. 27, 2006

(54) AUTOMATIC MOBILE DEVICE SCALABLE SYNCHRONIZATION BASED ON BATTERY STATE

(75) Inventors: Carl S. Marshall, Portland, OR (US); Rosa June Thanasophon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 10/186,636

(22) Filed: Jun. 28, 2002

(65) Prior Publication Data

US 2004/0003302 A1    Jan. 1, 2004

(51) Int. Cl.
  *G06F 1/30*     (2006.01)
  *G06F 17/30*    (2006.01)
  *G06F 13/00*    (2006.01)

(52) U.S. Cl. .................... 713/340; 707/204; 711/162

(58) Field of Classification Search ................ 713/300
  See application file for complete search history.

(56) References Cited

U.S. PATENT DOCUMENTS

| | | | |
|---|---|---|---|
| 5,414,861 A * | 5/1995 | Horning .................... 365/229 |
| 5,765,173 A * | 6/1998 | Cane et al. ................. 707/204 |
| 6,470,358 B1 * | 10/2002 | Beyda et al. ............... 707/201 |
| 6,880,051 B1 * | 4/2005 | Timpanaro-Perrotta ..... 711/162 |
| 2002/0038394 A1 | 3/2002 | Liang et al. |
| 2002/0073109 A1 | 6/2002 | Toriumi |

* cited by examiner

*Primary Examiner*—Lynne H. Browne
*Assistant Examiner*—Eric Chang
(74) *Attorney, Agent, or Firm*—Blakely, Sokoloff, Taylor & Zafman LLP

(57) ABSTRACT

A method and apparatus for selecting a subset of personal data stored in one electronic system based on the availability of a limited power supply and transmitting that subset of personal data to a second electronic system.

27 Claims, 4 Drawing Sheets

AUTOMATIC MOBILE DEVICE SCALABLE SYNCHRONIZATION BASED ON BATTERY STATE

FIELD OF THE INVENTION

A method and an apparatus for automatically scaling down the synchronization of data between two personal data storage devices based on the availability of power.

ART BACKGROUND

Electronic systems used to store and manipulate so-called personal data, such as addresses and phone numbers of contacts, schedules of meetings, "to-do" items, memos, attachments sent or received with correspondence, audio/visual data, etc., have come into wide acceptance and are widely used. Many of these electronic systems are commonly used stationary electronic or computer systems that typically have access to a steady external source of power, such as "desktop" or personal computer systems, as well as notebook computer systems that are "docked." Such stationary systems usually run software that either maintains such personal data on the stationary system, itself, or remotely accesses such personal data where it is stored on another more centralized system (typically a server system in a corporate environment). However, many of the rest of these electronic systems are commonly used portable electronic or computer systems that usually do not have access to a steady external source of power, such as "handheld" or "tablet" devices, including what are often called "personal data assistants" or PDAs, and notebook computer systems that are not "docked." Such portable systems usually rely on a portable power source, such as a battery, and run software that maintains such personal data locally on the portable system, itself.

It has become commonplace for user's of such electronic systems to use both stationary and portable systems to maintain and manipulate their personal data. In answer to this, many of such portable and stationary systems have been provided with hardware and software needed for a user to link them together at various times so that the personal data on each system can be shared (i.e., transmitted between them) and updated to reflect recent changes to the personal data on the other system. This process of sharing and updating personal data is referred to variously as "synchronizing," "synchronization" or "hot-syncing." Also, the increasing acceptance of such electronic systems has resulted in users storing ever more information on both their stationary and portable systems. In answer to this, even the smallest and most portable of handheld and credit-card forms of such electronic systems are being offered with ever increasing amounts of memory.

However, as the amount of data kept by users on such electronic systems has continued to increase, so has the amount of data that must be shared and updated whenever a user links such electronic systems together for synchronization. This, in turn, increases the amount of time required to perform synchronization and/or the speed at which data is accessed and transferred to allow synchronization to take place relatively quickly. Both this increase in the amount of data being shared and updated, and this increase in time and/or speed requires an increase in the amount of power used by each electronic system during synchronization.

For stationary systems with their ready access to an external steady power supply (usually provided by simply plugging such systems into a convenient wall socket to obtain standard AC power), such increased power requirements rarely pose a problem. However, for portable systems that often have access to nothing more than the limited power that can be stored in a battery, such increased power requirements can adversely affect the usability of such portable systems. By drawing sufficient power to carry out synchronization that a portable system may be unable to perform much in the way of subsequent functions until the user has taken the time to recharge or otherwise replenish the rather limited power source available to such a portable system. Also, performing a full synchronization may draw enough power that an electronic system with access to only limited power and which is designed to enter a low power state to conserve power, may do so in the middle of a full synchronization.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Although numerous details are set forth for purposes of explanation and to provide a thorough understanding in the following description, it will be apparent to those skilled in the art that these specific details are not required in order to practice the invention as hereinafter claimed.

A method and apparatus for limiting the power requirements for synchronization of personal data between electronic systems by scaling back the amount of data transferred during synchronization is disclosed. Specifically, prioritization of personal data to limit the quantity of personal data being transferred between electronic systems is performed to limit the amount of power required for synchronization by an electronic system that has access to a limited supply of power. Although the discussion is largely centered on the transfer of personal data between electronic systems used to store and manipulate personal data, it will be understood by those skilled in the art that the invention as hereinafter claimed is applicable to other forms of data and to other varieties of electronic systems used to store and/or manipulate other forms of data.

Figure 1:
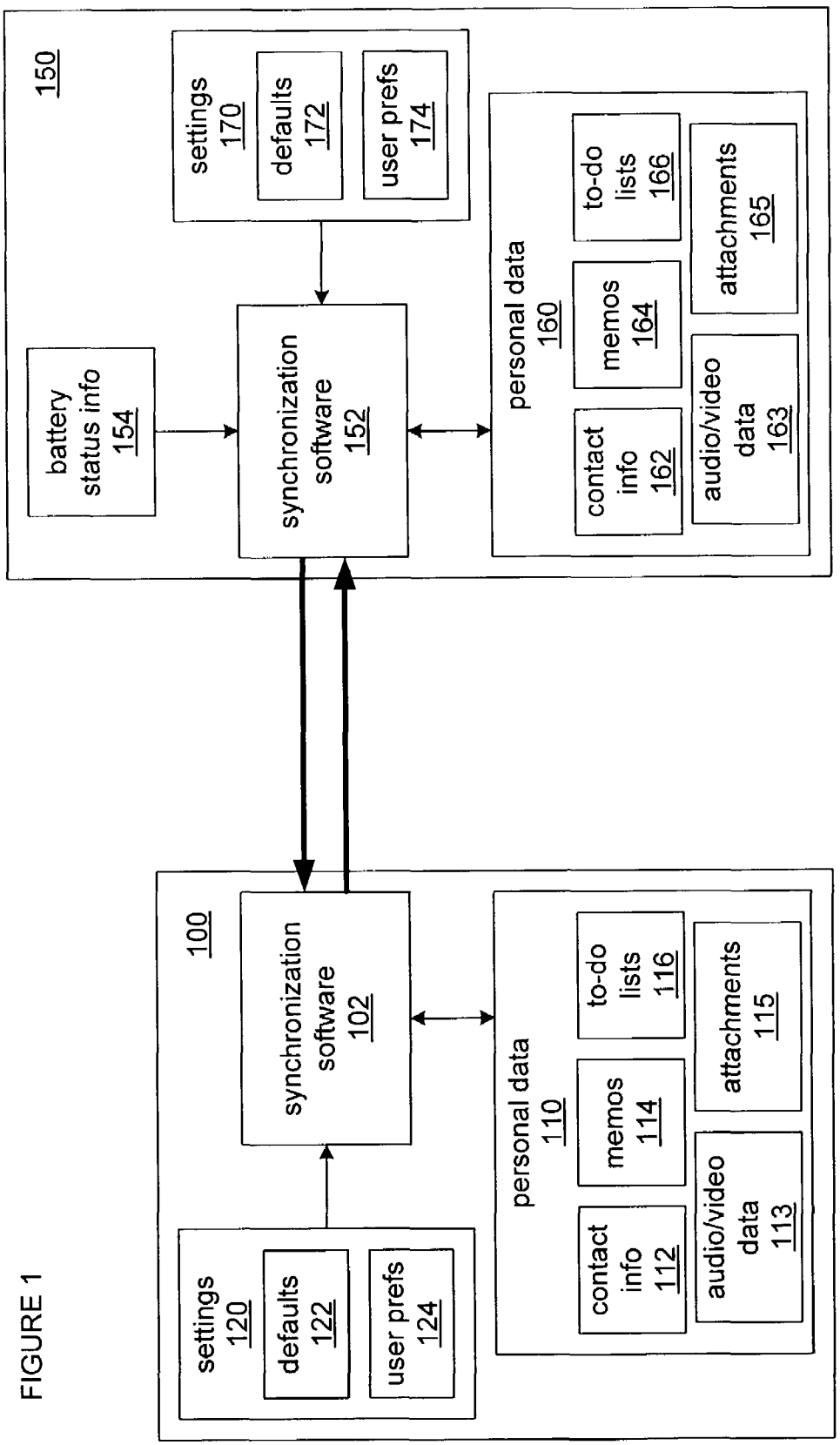
FIG. 1 is a block diagram of an embodiment of two linked electronic systems.

FIG. 1 is a block diagram of an embodiment of two electronic systems linked to enable synchronization. Electronic systems 100 and 150 maintain personal data 110 and 160, respectively. Personal data 110 may include various pieces of information of use to a user of electronic system 100, including, but not limited to contact info 112, audio/video data 113 (e.g., pictures, voice recordings, etc.), memos 114, attachments to correspondence 115, and/or to-do lists 116. Similarly, personal data 160 may include, but is not limited to contact info 162, audio/video data 163 (e.g., pictures, voice recordings, etc.), memos 164, attachments to correspondence 165, and/or to-do lists 166. Electronic systems 100 and 150 each have a processor (not shown) executing synchronization software 102 and 152 having access to personal data 110 and 160, respectively, stored in any of a number of forms of solid state or media-based storage device (also not shown) that could be made accessible to the processor to enable sharing and updating of personal data 110 and 160 through synchronization between electronic systems 100 and 150. Synchronization software 102 and 152 receive information on user preferences and/or other information controlling details of synchronization from settings 120 and 170, respectively. Settings 120 may include defaults 122 provided by the creators of electronic system 100 and/or the creators of the software running on electronic system 100, as well as user preferences 124. Correspondingly, settings 170 may include defaults 172 and/or user preferences 174. Furthermore, as depicted, electronic system 150 is portable has access only to a limited power source, such as a battery, so synchronization software 152 also receives battery status info 154, providing an indication of how much power is still available. When electronic systems 100 and 150 are linked, as shown in FIG. 1, synchronization software 102 and 152 begin communication to enable the transfer of data between electronic systems 100 and 150.

In one variation of this embodiment, both synchronization software 102 and 152 exercise a similar degree of control over the details of synchronization, and may even use a defined protocol to negotiate synchronization details that both electronic systems 100 and 150 will follow. In such a variation, both synchronization software 102 and 152 may each be able to independently exercise control over the amount of data transferred during synchronization. Synchronization software 152 may respond to an indication from battery status info 154 that only a very limited amount of power is left (so that engaging in a full synchronization is either not possible or should be avoided) by independently acting to limit the amount of data transferred during synchronization. Synchronization software 152 might limit the amount of personal data 160 transmitted to electronic device 100 and/or use some form of protocol to refuse transfers of some or all of personal data 110 that electronic device 100 might have otherwise transmitted to electronic device 150. In a case where both electronic devices 100 and 150 are powered with limited quantities of power, then both synchronization software 102 and 152 may independently act to limit the amount of data transferred during synchronization.

In another variation of this embodiment, a choice is made as to which electronic device will control the limitations placed on the amount of data transferred, and this choice could be made based on any of a number of factors. It may be that determinations of how much power is required to transmit information needed to coordinate a transfer of data, how much power is required to receive information needed to coordinate a transfer of data, and how much power is required to do the processing needed to arrive at what data will and will not be transferred or to carry out the actual updating of data provide the controlling factors. For example, if transmitting data requires considerably more power than receiving data, then it may be that electronic device 150, with its more limited access to power, simply receives information transmitted by electronic device 100 concerning the extent to which the personal data 110 has been altered since a previous synchronization, and synchronization software 152 then controls what data and the amount of data that is transferred between electronic systems 100 and 150. As another example, if the processing need to determine which pieces of data will or will not be transferred and/or to carry out the actual updating of data requires considerably more power than transmitting and/or receiving data, then it may be that electronic device 150, with its more limited access to power, simply transmits information concerning the status of available power and/or the degree to which personal data 160 has been altered since a previous synchronization, and synchronization software 102 then controls what data and the amount of data that is transferred between electronic systems 100 and 150.

Regardless of whether it is one or both of synchronization software 102 and 152, that controls the manner in which a transfer of data is limited to conserve power, where prioritization of personal data is used, the way in which personal data is prioritized may be based on any of a number of conceivable concepts of prioritization. For example, prioritization may be based on categories of personal data. For instance, it may be determined that contact information is the most important personal data to be transferred based on the theory that even if memorandums and/or schedules of things to do cannot be updated, at the very least, a user ought to have up-to-date information for contacting others so that they might receive other missing information through those contacts. It may be that personal data includes a number of pieces of audio and/or video data, in which each piece is of considerable size, requiring considerable power to transfer, and therefore, such data might be deemed to be "a luxury" and given a lower priority such that transferring it is deferred to being synchronized at some future opportunity when more power is available. Alternatively, prioritization may be based on chronology, such that the most recently modified or added information is deemed the most important personal data to be transferred based on the theory that less recently modified or added information is more likely to be old enough that a user will care less about it. As still another alternative, prioritization may be based on chronology whereby a determination of which of two electronic systems has personal data that has been most recently modified, added to and/or accessed will control the direction of transfer of data in a synchronization that is limited to a one-way transfer of data to conserve power. As those skilled in the art will appreciate from this discussion, any of a number of approaches to determine the exact way to limit the quantity of data transferred may be employed.

In one variation of this embodiment, the manner in which personal data 110 and/or 160 is prioritized is determined according to input provided by the user in user preferences 124 and/or 174. A user may be given the option of choosing whether a subset of data is chosen based on the type of data, the date on which data was last added/accessed/modified, some combination of subject and chronological approaches. It may also be that a user is given the option, within the data, itself, to specify pieces of data that are of higher or lower priority. For example, a user may be given an option to "highlight," "tag," or "mark" some pieces of data (such as specific pieces of contact information or specific memos) as having higher priority, while at the same time, the user might also have the option of indicating that other pieces of data (such as a video clip from a friend showing scenes of a recent vacation) as having lower priority. In another variation of this embodiment, this prioritization of personal data 110 and/or 160 may be done in accordance with default settings chosen and provided as defaults 122 and 172 by the creators of electronic devices 100 and 150 and/or the creators of synchronization software 102 and 152, respectively.

Figure 2A:
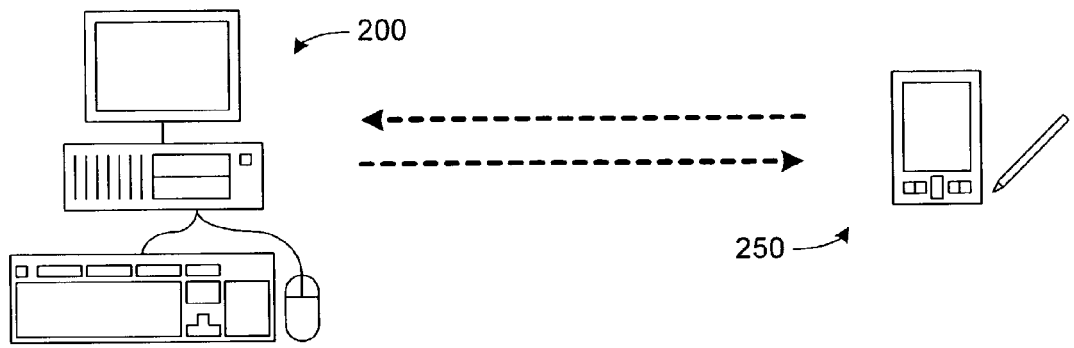
FIGS. 2a, 2b and 2c are diagrams of example embodiments of linkages between electronic systems.
Figure 2B:
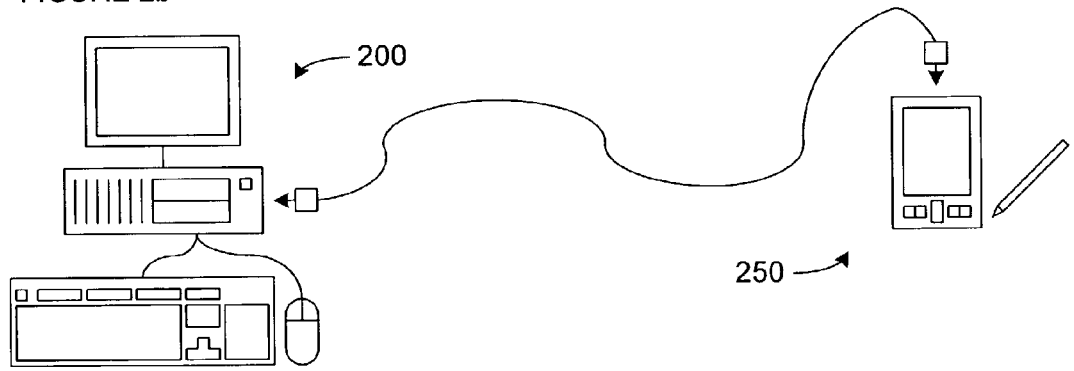
Figure 2C:
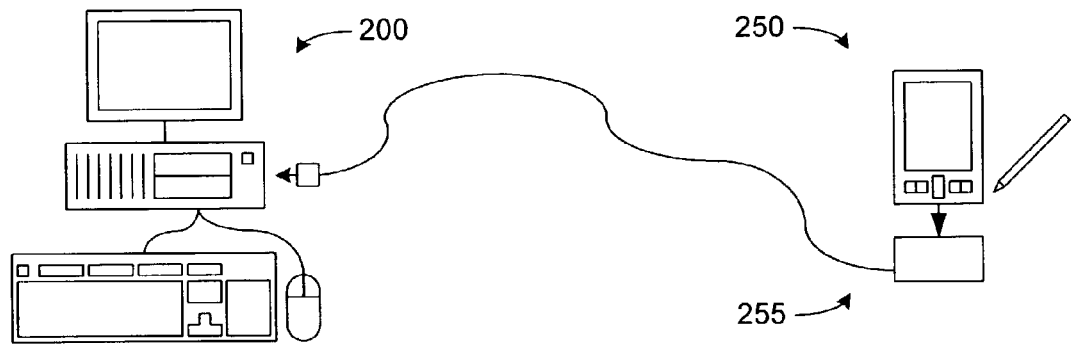

FIGS. 2a, 2b and 2c depict various embodiments of interaction between two electronic systems to carry out synchronization. In each of these three figures, electronic system 200 is depicted as being a typical "desktop" computer system, and electronic system 250 is depicted as being a typical "handheld" portable system. However, it will be appreciated by those skilled in the art that the exact form of both electronic systems 200 and 250 may be changed without departing from the spirit and scope of the invention as hereinafter claimed. Specifically, both electronic systems 200 and 250 may be portable systems of any of a variety of specific designs, or both electronic systems 200 and 250 may be stationary systems of any of a variety of specific designs.

FIG. 2a depicts electronic systems 200 and 250 in communication through a wireless form of linkage. For example, this linkage could entail the use of either radio or light waves transmitted and/or received by each of electronic systems 200 and 250. Where a wireless linkage is used, it is likely that a portable system such as electronic system 250 would then not receive the benefit of a connection to a steady power source, and therefore, would be dependent on a more limited portable power source carried with or within electronic system 250, such as a battery. As previously discussed with regard to FIG. 1, synchronization software in one or both of electronic systems 200 and 250, may respond to electronic system 250 having access only to a more limited power source, especially if there is an indication that there isn't much power left available. Therefore, prioritization of personal data and/or other techniques may need to be used to limit the amount of data transferred between electronic devices 200 and 250 during synchronization. Alternatively, in another variation of this embodiment, prioritization of data may be carried out regardless of the type of linkage or the availability of power, since it is not uncommon in wireless linkages for the transmission and/or reception of either radio or light waves to be blocked by any of a number of possible forms of interference. So, prioritization may already be used in synchronization across a wireless link to ensure that if such a link is broken before synchronization can be completed, at least some personal that is more likely to be of greatest importance to the user has been transferred.

FIG. 2b depicts electronic systems 200 and 250 in communication through a wired linkage. Specifically, this linkage could entail the connection of serial ports on each of electronic systems 200 and 250, with the serial ports being designed to conform to widely accepted serial interface standards such as RS-232C (perhaps requiring the use of a "null modem" cable) or USB (i.e., "universal serial bus"), as well as any of a number of other possible forms of serial interface. It is also possible that this linkage could entail the use of a networking interface, such as one of the various forms of Ethernet, etc. Whatever the exact physical form of the wired linkage, it is often the case in many of such serial or network linkages that power is not provided by one electronic system to another across such a linkage, and so, just as discussed in regard to the embodiment of FIG. 2a, the amount of data transferred during synchronization may have to be limited in some manner in response to limits in the availability of power for electronic system 250.

FIG. 2c depicts electronic systems 200 and 250 in communication through another form of wired linkage whereby electronic system 250 is plugged into base 255. Depending on the physical shape and size of electronic system 250, base 255 may be commonly referred to as either a "cradle" or "docking station." This embodiment of wired linkage differs most significantly from the wired linkage depicted in FIG. 2b in that it is common for a cradle or docking station or other forms of base 255 to provide power to an electronic system plugged into it. However, although the provision of power by base 255 may very well mean that electronic system 250 now has access to a steady external source of power, it is not unheard of for a user of such a portable electronic system as electronic system 250 to cut short the amount of time available to carry out synchronization. For example, a user may remove electronic system 250 from base 255 before a synchronization that may be underway is completed. Also, it is not uncommon for the even a steady external source of power provided to a cradle or docking station, such as base 255, to be limited in capacity. For example, a user of electronic system 250 may in some way provide an indication that the limited capacity of such a steady external power supply should be used more or used primarily for recharging a battery on electronic system 250 than for supplying power to carry out synchronization. Alternatively, electronic system 250 may have a battery that has been largely depleted so that it cannot supply sufficient power to carry out a complete synchronization, and limits on the capacity of the steady external power supply provided through base 255 may not allow for supplying power for both recharging the battery and for synchronization at the same time. In such cases, it may be deemed desirable to again limit the amount of data transferred during synchronization.

Figure 3:
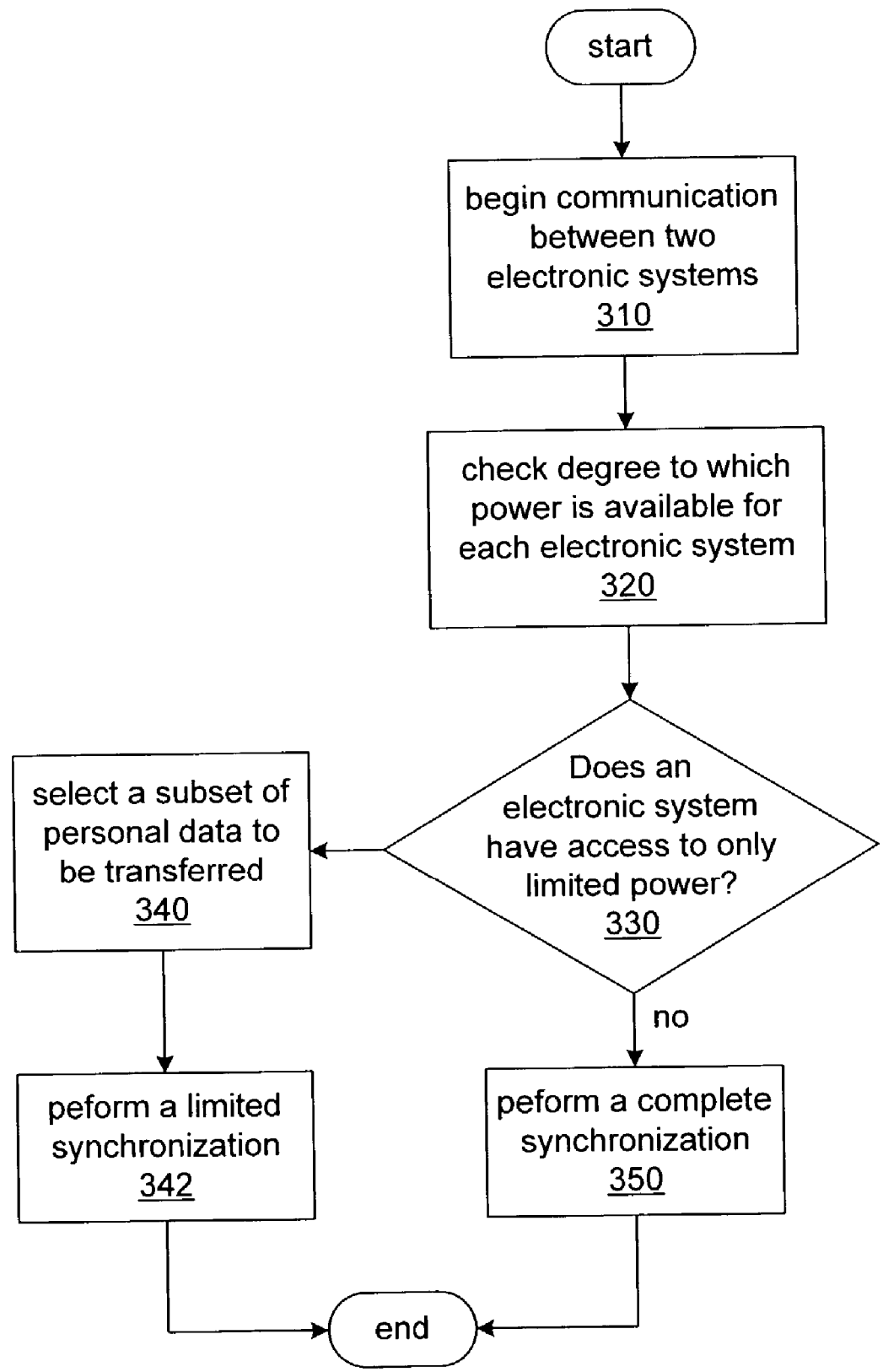
FIG. 3 is a flow chart of an embodiment of a procedure of a limited synchronization.

FIG. 3 depicts a flow chart of an embodiment of interaction between two electronic systems to carry out synchronization where the amount of data transferred is limited due to limits in a power source relied upon by one or both of the two electronic systems. At 310, communication between two electronic systems begins to enable the synchronization of personal data maintained by each of the two electronic systems. At 320, the degree to which power is available to each of the two electronic systems is checked. If, at 330, it is found that the power available to one or both of the two electronic systems is sufficiently limited that a complete synchronization impossible or undesirable, then at 340, a subset of personal data is selected to be transferred during synchronization, and a limited synchronization is carried out at 342. However, if at 330, it is found that both electronic systems have access to power sufficient to allow for complete synchronization, then a complete synchronization is performed at 350.

Figure 4:
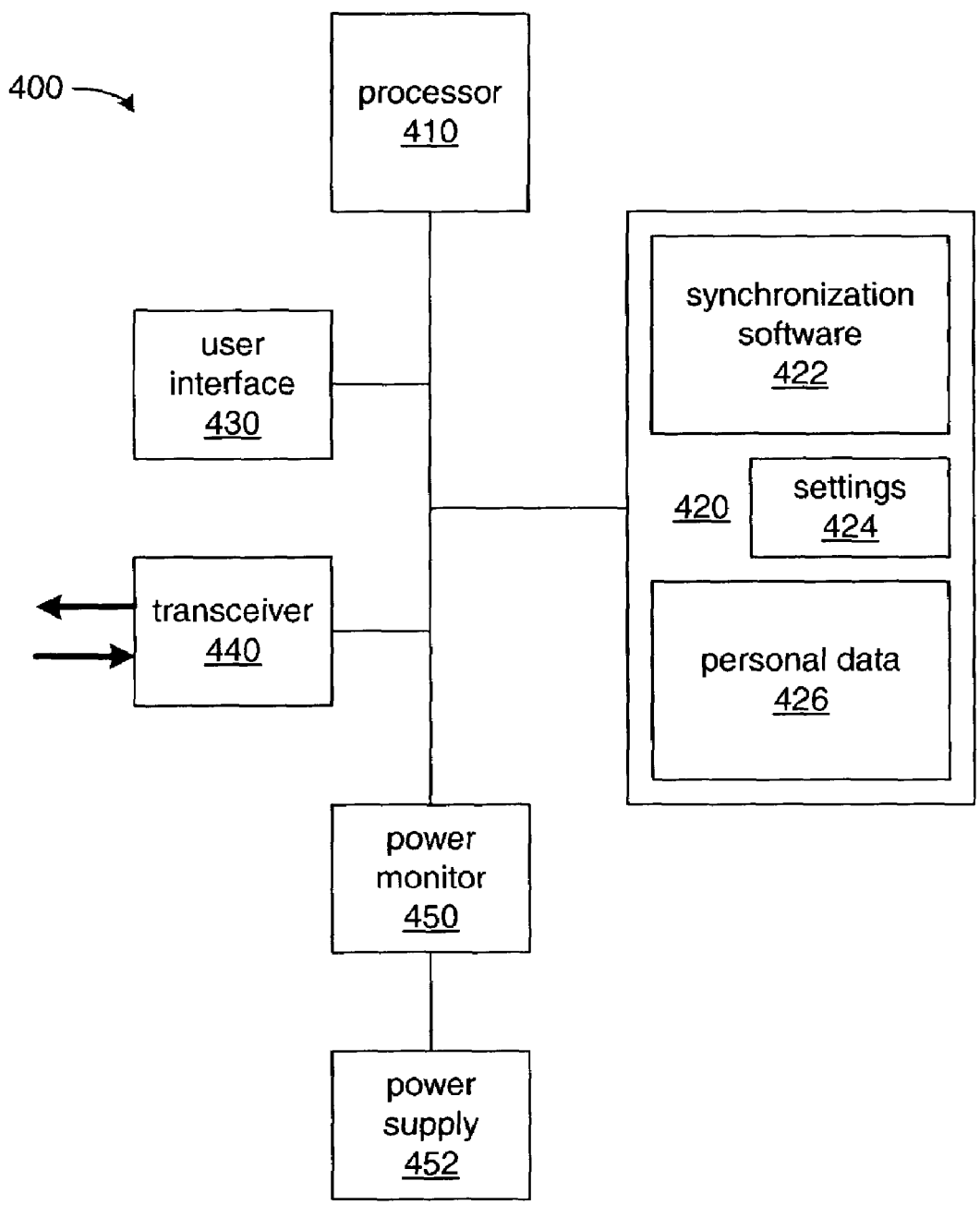
FIG. 4 depicts a block diagram of one embodiment of an electronic system.

FIG. 4 depicts a block diagram of one embodiment in the form of electronic system 400. Processor 410 is coupled to storage 420, user interface 430, and transceiver 440. Storage 420 may include some form of solid state storage device such as static RAM, dynamic RAM, ROM, or a non-volatile rewritable form of solid state memory such as EPROM or flash-programmable memory. Storage 420 maintains synchronization software 422, settings 424 and personal data 426. Within personal data 426 may be any of a number of forms of data of interest to a user of electronic system 400, including memos, attachments to correspondence, contact information, to-do lists, personal notes written by a user to himself/herself, audio/video data, etc. User interface 430 may provide a screen and keyboard, a screen and handwriting input support, or any of a number of approaches to allow a user of input or edit the contents of personal data 426. In variations of electronic system 400 making use of a power supply with some form of limitation on its capacity, processor 410 may also be coupled to power supply monitor 450 which serves to monitor and provide status information to processor 410 concerning the amount of power available from power supply 452.

Processor 410 accesses storage 420 to execute the instructions making up synchronization software 422. In executing those instructions, processor 410 may be caused to access settings 424. Settings 424 may include default settings provided by the creators of electronic system 400 and/or synchronization software 422. Settings 424 may include indications of decisions made by a user as to how the user prefers various aspects of synchronization to be carried out. Also, in executing those instructions, processor 410 may access and use transceiver 440 to begin communication with another electronic system to enable synchronization of personal data 426. In cases where power supply 452 is of limited capacity, processor 410 may also be caused to access power supply monitor 450 to receive an indication of the amount of power available as input to making a determination as to whether or not synchronization is possible, and to what extent personal data 426 is to be synchronized.

As an alternative to storing synchronization software 422 at least solely in storage 420, electronic system 400 may have access to a machine-readable medium such as magnetic and/or optical disks or tape, or other non-volatile forms of storage media to supply instructions that could be executed by processor 410 of computer system 400, including the instructions making up synchronization software 422. The execution of such instructions may cause processor 410 and/or electronic system 400 to perform any of a number of operations involving storage 420, user interface 430, transceiver 440 and/or power supply monitor 450. Although electronic system 400 is depicted with an assortment of components often found as part of typical computer systems or PDAs, it will be understood by those skilled in the art that electronic system 400 is depicted merely as one example of a machine having a processing element, and that other forms of machines with a processing element may be substituted for electronic system 400 without departing from the spirit and scope of the invention as hereinafter claimed.

The invention has been described in conjunction with the preferred embodiment. Numerous alternatives, modifications, variations and uses will be apparent to those skilled in the art in light of the foregoing description. It will be understood by those skilled in the art that the invention as hereinafter claimed may be practiced in support of a wide variety of electronic systems involved in a wide variety of types of data transfer, and where limits in available power for carrying out a data transfer may exist for any of a variety of reasons. Also, although specific reference has been made to common AC power and batteries as forms of power sources, it will be understood by those skilled in the art that the invention as hereinafter claimed may be practiced in conjunction with any of a wide variety of forms of power supply, either with or without limits that would necessitate limiting the transfer of data.

What is claimed is:

1. An article of manufacture comprising:
a machine-accessible medium comprised of instructions that, when executed by a processor, cause a first machine to perform operations comprising,
using a linkage between the first machine and a second machine to begin communication with the second machine;
receiving status information concerning availability of a power from a limited power source coupled to the first machine;
selecting a subset of a first personal data stored within the first machine to be synchronized with a second personal data stored within the second machine based on the status information concerning the availability of power for the first machine from the limited power source; and
synchronizing the subset of the first personal data with the second personal data.

2. The machine-accessible medium of claim 1, further comprising instructions that, when executed by the processor, cause the first machine to transmit the status information concerning the availability of power to the second machine.

3. The machine-accessible medium of claim 1, wherein the subset of the first personal data selected to be synchronized is no personal data.

4. The machine-accessible medium of claim 1, further comprising instructions that, when executed by the processor, cause the first machine to refuse to synchronize at least a portion of the first personal data.

5. The machine-accessible medium of claim 1, further comprising instructions that, when executed by the processor, cause the first machine to perform operations comprising,
accessing settings stored within the first machine; and
selecting the subset of the first personal data based on the settings.

6. The machine-accessible medium of claim 5, wherein the settings are comprised of user preferences providing an indication by a user of the relative priorities of a plurality of portions of the first personal data.

7. The machine-accessible medium of claim 5, wherein the settings are comprised of default settings providing an indication of the relative priorities of a plurality of portions of the first personal data.

8. The machine-accessible medium of claim 7, further comprising instructions that, when executed by the processor, cause the first machine to permit a user to override the default settings.

9. The machine-accessible medium of claim 1, further comprising instructions that, when executed by the processor, cause the first machine to select the subset of the first personal data to be synchronized based on the subject of the subset of the first personal data.

10. The machine-accessible medium of claim 1, further comprising instructions that, when executed by the processor, cause the first machine to select the subset of the first personal data to be synchronized based on a date on which at least a portion of the subset of the first personal data was edited.

11. A method comprising:
using a linkage between a first electronic system and a second electronic system to begin communication with the second electronic system;
receiving a status information concerning availability of power from a limited power source coupled to the first electronic system;
selecting a subset of a first personal data stored within the first electronic system to be transmitted to the second electronic system based on the status information concerning the availability of power for the first electronic system from the limited power source; and
transmitting the subset of the first personal data to the second electronic system.

12. The method of claim 11, further comprising transmitting the status information concerning the availability of power to the second electronic system.

13. The method of claim 11, wherein the subset of the first personal data is no personal data.

14. The method of claim 11, further comprising refusing to receive at least a portion of a second personal data stored within the second electronic system.

15. The method of claim 11, further comprising:
receiving at least a portion of a second personal data stored within the second electronic system; and
using the portion of the second personal data received from the second electronic system to update at least a portion of the first personal data.

16. The method of claim 11, further comprising:

accessing settings stored within the first electronic system; and selecting the subset of the first personal data based on the settings.

17. The method of claim 16, wherein the settings are comprised of user preferences providing an indication by a user of the relative priorities of a plurality of portions of the first personal data.

18. The method of claim 16, wherein the settings are comprised of default settings providing an indication of the relative priorities of a plurality of portions of the first personal data.

19. The method of claim 11, further comprising:

accessing settings stored within the first electronic system; and selecting a portion of the second personal data to be refused to be received from the second electronic system based on the settings.

20. The method of claim 19, wherein the settings are comprised of default settings providing an indication of the relative priorities of a plurality of portions of the second personal data.

21. An apparatus comprising:

a limited power source;

a first electronic system coupled to the limited power source that stores a first personal data and uses a linkage to transmit a subset of the first personal data, wherein the subset is selected based on status information concerning the availability of power from the limited power source for the first electronic system; and a linkage to provide communication between the first electronic system and a second electronic system storing a second personal data to enable the transmission of the subset of first personal data.

22. The apparatus of claim 21, wherein the first electronic system is a handheld portable system that allows a user to manipulate the first personal data.

23. The apparatus of claim 21, wherein the linkage is comprised of a first light wave transceiver within the first electronic system and a second light wave transceiver within the second electronic system, and wherein the first and second light wave transceivers are aligned relative to each other to enable the transmission of data by way of light waves between them.

24. The apparatus of claim 21, wherein the first personal data is comprised of contact information caused to be stored in the first electronic device by a user of the first electronic system.

25. The apparatus of claim 21, wherein the limited power source is a battery carried within the first electronic system.

26. The apparatus of claim 21, wherein the linkage is comprised of a cable coupling the first electronic system to the second electronic system.

27. The apparatus of claim 26, wherein the limited power source is supplied through the linkage.

* * * * *